United States Patent [19]

Yamaguchi et al.

[11] 4,316,440
[45] Feb. 23, 1982

[54] KNOCK DETECTING APPARATUS FOR INTERNAL COMBUSTION ENGINE

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 98,247

[22] Filed: Nov. 28, 1979

[30] Foreign Application Priority Data

Apr. 28, 1979 [JP] Japan .................... 54-53142

[51] Int. Cl.³ .................... G01L 23/22; G01L 33/22; F02P 5/14
[52] U.S. Cl. .................... 123/428; 123/435; 73/35
[58] Field of Search .................... 123/428, 435; 73/35

[56] References Cited

U.S. PATENT DOCUMENTS

| | | | |
|---|---|---|---|
| 2,530,931 | 11/1950 | Alexander | 73/35 |
| 2,660,883 | 12/1953 | Wyczalek | 73/35 |
| 2,973,638 | 3/1961 | Fluegel | 73/35 |
| 3,395,569 | 8/1968 | Sheridan et al. | 73/35 |
| 3,540,262 | 11/1970 | Wostl et al. | 73/35 |
| 3,942,359 | 3/1976 | Arrigoni et al. | 73/35 |
| 4,012,942 | 3/1977 | Harned | 123/425 |
| 4,111,035 | 9/1978 | West et al. | 73/35 |
| 4,163,385 | 8/1979 | Kato et al. | 73/35 |
| 4,265,206 | 5/1981 | Garcea | 123/425 |

FOREIGN PATENT DOCUMENTS

| | | | |
|---|---|---|---|
| 1476322 | 6/1964 | Fed. Rep. of Germany | 123/425 |
| 54-103911 | 8/1979 | Japan | 123/425 |
| 1185499 | 3/1970 | United Kingdom | 73/35 |

Primary Examiner—Raymond A. Nelli
Attorney, Agent, or Firm—Cushman, Darby & Cushman

[57] ABSTRACT

A knock detecting apparatus for internal combustion engines, includes at least two vibration detectors having different resonance characteristics and encased in one container. The vibration detectors are comprised by piezoelectric devices (bimorph cells) or magnetic devices having reed members of magnetic material. The vibration detectors are interconnected by a lead wire to combine the outputs thereof and to produce a cumulative output.

5 Claims, 10 Drawing Figures

KNOCK DETECTING APPARATUS FOR INTERNAL COMBUSTION ENGINE

BACKGROUND OF THE INVENTION

1. Field of the Invention

The present invention relates to a knock detecting apparatus adapted for use with internal combustion engine ignition timing control systems, etc., which is designed to function so that knock is detected from the vibrations produced both inside and outside the engine cylinders due to the cylinder pressure and the ignition timing is controlled to obtain the desired knock intensity.

2. Description of the Prior Art

It is well known in the art that there is a close correlation between the ignition timing and the cylinder pressure. When a mixture is exploded in the cylinder, in the absence of knocking there is no superposition on the cylinder pressure of any higher harmonic component (usually a frequency component in the frequency band which is determined by the cylinder bore diameter and the velocity of sound in the combustion and which is produced by the intermittent and rapid combustion), whereas when knocking occurs such higher harmonic starts to superpose on the cylinder pressure at around the maximum value of the cylinder pressure and this results in the generation of vibrations or sound outside the cylinders. Examination of the pressure signal generated inside the cylinders and the generation of vibrations or sound outside the cylinders shows that the beginning of knock (trace knock) starts to occur at an engine crank angle at which the cylinder pressure attains the maximum value and that as the knock is increased (to light knock and heavy knock) the higher harmonic starts to superpose considerably earlier (or on the ignition side) than the maximum cylinder pressure crank angle. In this case, it is considered that the frequency of the higher harmonic caused by the knock is linearly determined by the cylinder bore diameter and the velocity of sound in the combustion as mentioned previously and it is also believed that this frequency is produced only in a specified frequency band (usually in the range of 7 to 10 kHz). As a result, knock detecting apparatus known in the art are based on the principle that the desired knock detection can be performed by simply detecting the vibration produced outside an engine or by noting only specified frequencies and the detection of knock is performed in this way so as to control the ignition timing. This type of known apparatus has been found disadvantageous in that the detection accuracy is subject to deterioration depending on the operating conditions of the engine and there are certain operating conditions under which the detection of very weak trace knock is difficult. More specifically, where the detection of knock is performed in a frequency band ranging from 7 to 10 kHz, when the speed increases, the vibration noise (e.g., vibration noise due to the valve seating action) produced in the engine body increases with the resulting deterioration of the S/N ratio. Particularly, under high speed and load operation of the engine the effect of such vibration noise on the knock detection is so large that the detection of trace knock is almost impossible. If one dares to control the ignition timing despite the deteriorated S/N ratio, this will tend to cause an excessively heavy knock and sometimes damages to the engine body including melting of the spark plugs will be caused. In order that such damages may be prevented, generally it is unavoidable to stop controlling the ignition timing under the high speed and load operation. On the other hand, in the case of known apparatus designed to simply detect vibrations without noting any specified frequency band, the effect of such vibration noise is so large that the detection of trace knock is practically impossible and smooth control of the ignition timing cannot be expected. Investigations of knock detecting methods intended to overcome the deficiencies of the prior art methods showed that the occurrence of knock would not be limited to any single frequency band but takes place in a plurality of frequency bands and that the recognition of such plurality of frequency bands would make it possible to accurately detect the occurrence of knock even under high engine speed operation without any danger of the engine vibration noise being superposed on the cylinder pressure. FIG. 1 of the accompanying drawings shows the results obtained by mounting a piezoelectric element type vibration detector on the engine block and analyzing the vibration outputs indicative of the presence and absence of knock. In the Figure, designated by A and B are the vibration outputs (back noise) produced at the engine speeds of 1500 and 3000 rpm, respectively, under high load operation (WOT) without any knock. Designated by C is the vibration output produced at the engine speed of 3000 rpm under WOT with knock. It will be seen from the results that the knock occurred in the frequency band of 5 to 10 kHz (hereinafter referred to as a low frequency band) as well as in the band of 11 to 13 kHz (hereinafter referred to as a high frequency band) and that under high engine speed operation the effect of vibration noise will be reduced and the S/N ratio will be improved in the frequency band of 11 to 13 kHz. It will also be seen that the sensitivity of the low frequency is improved under the low engine speed operation. The vibrations of the high frequency band have the most tendency to occur at around the peak cylinder pressure and the vibrations of the low frequency band have the most tendency to occur after the peak cylinder pressure. These results conform excellently with the cylinder pressure waveforms showing that the knocking frequency cannot be determined linearly as believed in the past and there are some special combustion regions. Further, while there are certainly cases where such high and low frequency bands cannot be absolutely determined depending on the types of engines due to the frequency bands being influenced by the shape and conditions of the combustion chamber, it is absolutely true that knock occurs in a plurality of frequency bands.

SUMMARY OF THE INVENTION

It is the object of the invention to provide an improved knock detecting apparatus which is simple in construction but capable of detecting knock under all the operating conditions of engines.

Thus the apparatus of the invention has among its great advantages the fact that there are provided a plurality of vibration detecting means having different resonance points so as to be separately operable to resonate with different frequency bands and having their detection outputs connected to each other so as to detect knock as a sum of the respective frequency band output signals, whereby even if the frequency band of the knock changes or the condition of vibration noise generation changes with a change in the engine operating conditions, the knock is always detected by any one of the resonance characteristics and thus stable dection of knock as well as the detection of very weak knock are ensured under all the engine operating conditions without using any specially designed resonance characteristic selection means as well as discrimination means but with the aid of a simple technique of combining the resonance outputs. Another advantage is the elimination of serious disadvantages of the known apparatus, that is, the fact that at high engine speeds vibration noise is produced so that the detection of knock and hence the control of the ignition timing are made impossible, that the S/N ratio is deteriorated so that melting of the spark plugs and sometimes damages to the engine body would be caused if any attempt to control the ignition timing is dared under the condition where only the detection of relatively high intensity knock (heavy knock) is possible and that smooth control of the knock is made impossible under the high load and speed operation which will ensure the greatest improvement on the fuel consumption and efficiency, and this greatly improves the durability and efficiency of an engine.

DESCRIPTION OF THE PREFERRED EMBODIMENTS

The invention will now be described in greater detail with reference to the illustrated embodiments.

Figure 1:
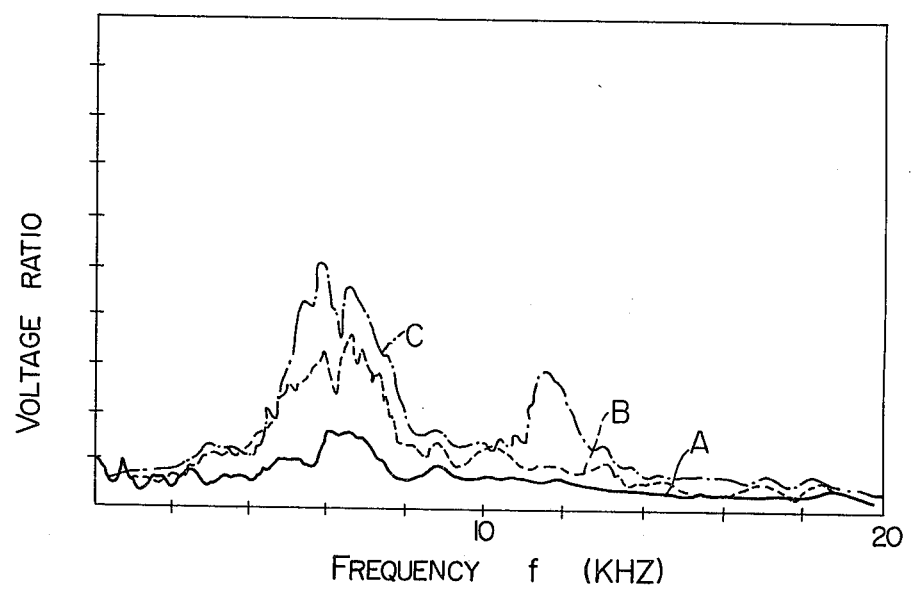
FIG. 1 is a characteristic diagram showing the vibration frequency distribution according to the presence and absence of knock in a particular internal combustion engine.
Figure 2:
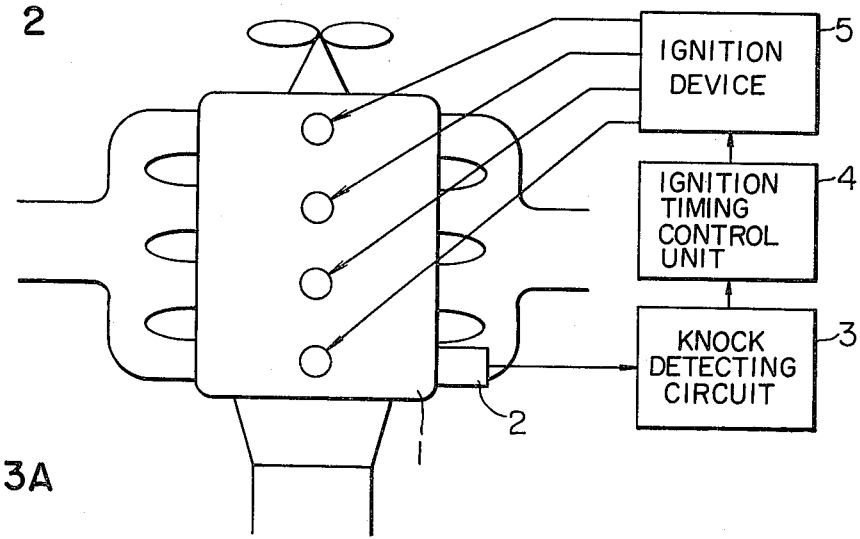
FIG. 2 is a schematic block diagram showing the construction of a knock feedback ignition system incorporating a knock detecting apparatus according to the invention.
Figure 3A:
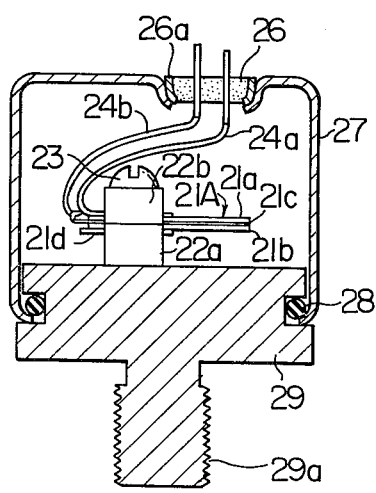
FIG. 3 shows a first embodiment of the apparatus according to the invention, with FIG. 3A showing its longitudinal sectional view, FIG. 3B its cross-sectional view, FIG. 3C its partial longitudinal sectional view and FIG. 3D its partial enlarged longitudinal sectional view.
Figure 3B:
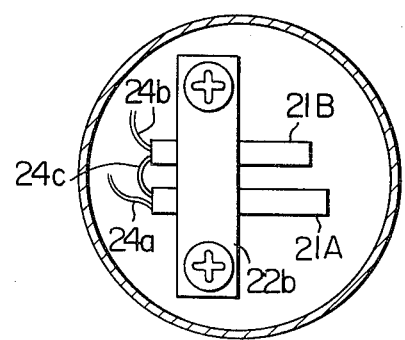
Figure 3C:
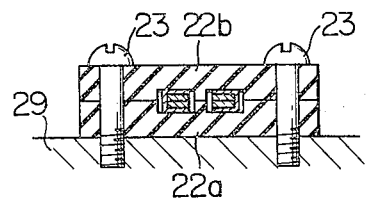
Figure 3D:
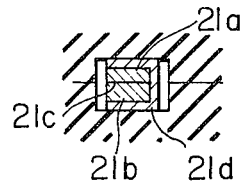

Referring to FIG. 2, there is illustrated the construction of a knock feedback ignition system incorporating the apparatus of this invention. In the Figure, numeral 4 designates a four-cylinder in-line type internal combustion engine, and a knock detecting apparatus 2 having a plurality of resonance characteristics is firmly attached to one side of the cylinder block (on the No. 4 cylinder side in the illustration) of the engine 1 by means of a screw or the like. Numeral 3 designates a knock detecting circuit responsive to the output signal of the knock detecting apparatus 2 to detect the occurrence of knock in the engine 1, and 4 an ignition timing control unit responsive to the output of the detecting circuit 3 to advance or retard the ignition timing to the optimum timing. The output signal of the control unit 4 is used to ignite the mixture through a known type of ignition unit 5 and the spark plugs mounted in the engine 1.

With the construction described above, the output AC signal of the knock detecting apparatus 2 is amplified and then half-wave or full-wave rectified whereby the output of the detecting apparatus 2 is separated into the engine vibration noise produced during the initial combustion period just after the ignition having no knock tendency and the knock signal produced during the subsequent period having the greatest knock tendency and then the signals are sampled for a predetermined time or crank angle so as to detect whether the ratio therebetween is greater or smaller than a predetermined value and thereby to determine the presence of knock. The result obtained is applied to the ignition timing control unit 4 to control the ignition timing in such a manner that the ignition timing is retarded a predetermined value when there is knock and the ignition timing is advanced a predetermined value when there is no knock. As regards the determination of knock, it is possible to make the determination by integrating the rectified signals and producing the ratio between the average values, to determine on the basis of the difference between the peak values obtained by the peak holding or to determine the presence of knock through a statistical processing (e.g., on the basis of a percentage of the occurrences of knock in every 100 times of ignition). In any way, the performance of the ignition system is dependent on the detection accuracy of the knock detecting apparatus 2 irrespective of the knock discrimination method as well as the spark advance control method used and the effectiveness of the detecting apparatus according to the invention is affected in no way.

Next, the construction of the knock detecting apparatus 2 will be described in detail. FIGS. 3A to 3D show a first embodiment of the detecting apparatus of a type employing piezoelectric elements. In the Figure, numerals 21A and 21B designate piezoelectric type vibration detectors which are called as bimorph cells and each comprising piezoelectric elements $21a$ and $21b$ glued together with a central electrode $21c$ interposed therebetween. The vibration detectors 21A and 21B each including an outer electrode $21d$ connecting the upper and lower piezoelectric elements $21a$ and $21b$, are placed between insulators $22a$ and $22b$ each made of ceramic, bakelite or the like and having a recess and firmly fixed to a metallic stay 29 with small screws 23. The central electrode $21c$ of the vibration detector 21A is connected to the outer electrode $21d$ of the other vibration detector 21B with a lead wire $24c$ and the other outer electrode $21d$ of the vibration detector 21A and the other central electrode $21c$ of the vibration detector 21B are respectively brought to the outside by means of lead wires $24a$ and $24b$ so as to deliver an output to the outside through the electrodes of a sealing terminal 26 (generally called as a hermetic seal) comprising two electrodes insulated with glass. The terminal 26 has its metallic housing $26a$ soldered to a metallic cover 27 which in turn is fixed, along with a sealing member 28 made of rubber or the like, to the stay 29 by caulking the end of the cover 27. The stay 29 includes on its lower part a mounting threaded portion $29a$ and the stay 29 is fixedly fastened to the cylinder block by the threaded portion $29a$. The sensing direction of the detecting apparatus 2 is the vertical direction shown by the arrow in the Figure. The vibration detectors 21A and 21B mounted in the detecting apparatus 2 are identical in material and construction and consequently their resonance frequencies are dependent on their lengths.

In the Figure, the shorter vibration detector 21B has a higher resonance point and the vibration detectors 21A and 21B are respectively designed to produce the peak resonance at 8 and 12 kHz, respectively. Further, the satisfactory care is given to the insulation between the vibration detectors 21A and 21B. The vibration detectors 21A and 21B are connected in series or parallel with each other so that their outputs have the same phase and the number of the output lines from the detecting apparatus 2 is in effect reduced to 2. (The stay 29 may be used as an output line, that is, one of the output lines may be grounded to the stay 29. In this case, the number of the output lines is 1). Each of the vibration detectors 21A and 21B has a resonance characteristic for a specified frequency. As a result, the detector has a good sensitivity to vibration frequencies at and near the specified frequency and the S/N ratio is much improved with respect to the noise of the other frequency bands.

Figure 6:
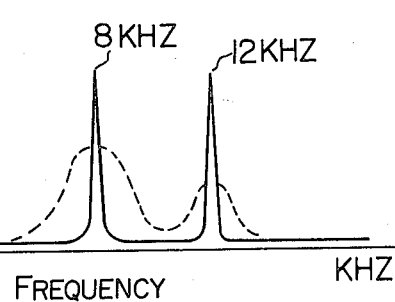
FIG. 6 is an output frequency characteristic diagram for the embodiment shown in FIG. 3.

The operation of the detecting apparatus 2 is as follows. With the detecting apparatus 2 mounted to the cylinder block, when the engine is operated, the vibration detectors 21A and 21B receive the force in the direction of the arrow and an output corresponding to the force is generated. Since the vibration detectors 21A and 21B are interconnected by a lead wire, the separately generated knocking vibrations in the different frequency bands are combined and the resulting sum signal is delivered. This results in the detecting apparatus having the composite sensitivity shown by the solid line in FIG. 6. As a result, even if the vibration noise is increased or the magnitude of the frequency component changes depending on the engine conditions, the knock of one or the other frequency bands will always be detected and the knock can be detected stably. The dotted line in FIG. 6 is a characteristic curve schematically showing the knock intensities.

While the above-described embodiment has been described as consisting of the piezoelectric element type by way of an example of the knock detecting apparatus 2 whose resonance points exist in different frequency bands, what is important for the detecting apparatus 2 is the fact that it has two resonance points existing in different frequency bands and the resulting signals are combined to obtain a composite result, and consequently detecting means of any principle may be used. It is also possible to use a plurality of different detectors each having a resonance characteristic and combine their output signals. However, this method requires expensive detectors and a special care must also be taken in mounting the detectors to an engine, since the output characteristic varies depending on the manner and positions in which the detectors are mounted to the engine (the vibrations are transmitted differently depending on the position of the detectors).

Figure 4A:
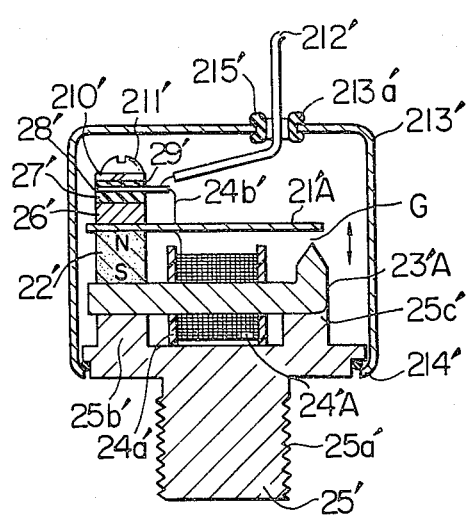
FIG. 4A is a longitudinal sectional view showing a second embodiment of the apparatus according to the invention.

Next, a second embodiment of the detecting apparatus 2 designed to detect knock magnetically will be described in which vibration detectors are constituted by magnetic devices. In FIG. 4A showing the construction of the detecting apparatus 2 according to the second embodiment, numeral 21'A designates a reed member made of a magnetic material such as iron or iron-nickel alloy and having a resonance point which provides resonance at a specified knocking frequency, 22' a magnet having a magnetic force, and 23'A a core made of a material such as iron, iron-nickel alloy or ferrite and adapted to form a magnetic path along with the reed member 21'A and the magnet 22'. The magnetic path includes an air gap G located between the reed member 21'A and the core 23'A and the ends of the reed member 21'A and the core 23'A facing the gap G are formed into acute angle shape. As a result, when the read member 21'A vibrates in the direction of the arrow, the gap G is varied and the reluctance of the magnetic path is also varied. Numeral 24'A designates a coil for detecting a change in the magnetic flux in the magnetic path. A coil bobbin 24a' is formed with an opening so that the core 23'A can be extended through the central portion thereof and the coil conductor is wound on the outer surface of the bobbin 24a'. The bobbin 24a' is firmly secured to the core 23'A by means of adhesion or the like so as to prevent a change in the relative position of the coil 24'A and the core 23'A from changing the number of magnetic lines of force passing through the magnetic path. Numeral 25' designates a stay comprising a threaded portion 25a formed on its lower part for mounting the detecting apparatus to the engine cylinder block and supporting portions 25b' and 25c' formed on its upper part for mounting the core 23' thereon and the stay 25' is made of iron, brass or the like. Numeral 26' designates a press bar for the above-mentioned magnetic path forming component parts, which is firmly secured, along with insulating sheets 27' and 29', a lug piece 28' for mounting a coil output terminal 24b' and a washer 210', to the supporting portion 25b' of the stay 25' with a small screw 211'. By using the reed members 21'A and 21'B (FIG. 4B) having different lengths, two vibration detectors respectively having resonance points of 8 and 12 kHz and arranged magnetically independently of each other, are mounted on the stay 25' parallely in the similar manner as the previously mentioned piezoelectric detectors. The two coils 24'A and 24'B are connected in series so that their output signals are in phase and the signals are delivered to the outside through the lug pieces 28'. (Alternatively, one end of the coils is connected to the stay 25' and the single output line is brought to the outside.) Numeral 213' designates a cover fitted by caulking on the stay 25' with a sealing member 214' such as rubber being interposed therebetween and the cover 213' is formed with holes 213a' for bringing lead wires 212' to the outside. Numeral 215' designates rubber bushings for holding the lead wires 212' in place. The detecting apparatus 2 is firmly secured to the engine by screwing the threaded portion 25a' into the cylinder block so that the whole detecting apparatus 2 vibrates along with the cylinder block.

Figure 4B:
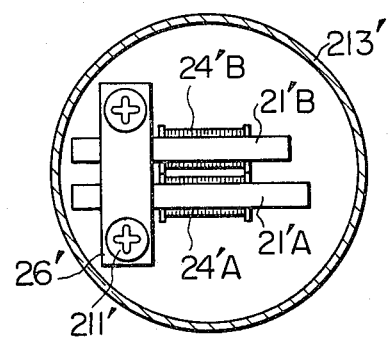
FIG. 4B is its cross-sectional view.

In accordance with the embodiment shown in FIGS. 4A and 4B, the knocking vibration from the cylinder block is transmitted to the reed members 21'A and 21'B through the stay 25'. Each of the reed members 21'A and 21'B vibrates in accordance with the frequency and magnitude of the knocking vibration as well as the natural vibration of the reed member itself. In this case, for each vibration detector, since the core 23'A, the coil 24'A and the magnet 22' are assembled securely so as to vibrate with the stay 25' as a unit, the reed member 21'A alone is relatively vibrated in the magnetic path in response to the knocking vibration and the length of the air gap G is varied correspondingly. It is preliminarily designed so that the magnet 22' provides a predetermined magnetic flux which passes through the core 23'A and the reed member 21'A and consequently a change in the air gap G results in a change in the magnetic flux passing through the magnetic path. The coil 24'A detects the change in the magnetic flux or the knocking vibration as a voltage. Since the two vibration detectors comprising the reed members 21′A and 21′B and arranged in parallel have their outputs connected in series, a composite output of the signals generated from the detectors at the resonance points of 8 and 12 kHz, respectively, is generated from the detecting apparatus 2 and this corresponds to that shown in FIG. 6. In this way, the knock is detected stably irrespective of the conditions of the engine. This magnetic detecting method is excellent in stability and strength in that the detection is not easily affected by humidity due to the low output impedance and also the possibility of the superposition of noise due to the ignition noise is small.

Figure 5:
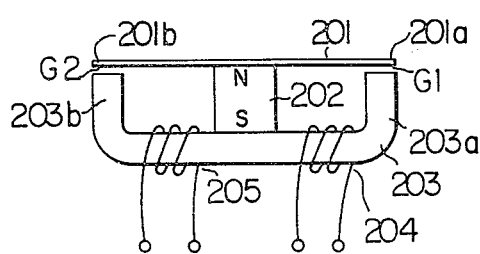
FIG. 5 is a schematic front view showing a third embodiment of the apparatus according to the invention.

FIG. 5 illustrates a schematic diagram of a third embodiment of the invention in which two magnetic paths are arranged in opposite positions differing from the embodiment of FIG. 4 in which the magnetic paths are arranged in a parallel relation. In the Figure, numeral 201 designates means corresponding to the previously mentioned reed members with the resonance points and it includes air gaps $G_1$ and $G_2$ at the opposite positions. This reed means may be composed of a single sheet or it may be divided into two parts and there will be no problem if it is firmly held in place. Numeral 202 designates a magnet, and 203 a core consisting of a C-shaped magnetic material. One magnetic flux passes through a path comprising the north pole of the magnet 202, one part 201a of the reed means 201, the gap $G_1$ and one part 203a of the core 203 and the other magnetic flux passes through another path comprising the north pole of the magnet 202, the other part 201b of the reed means 201, the gap $G_2$ and the other part 203b of the core 203. Numerals 204 and 205 designate coils wound on the core 203 forming a part of the two magnetic paths. In this case, the resonance points can be similarly varied by changing the length of the respective sides of the reed means 201.

While the vibration detecting methods of the piezoelectric type and of the coil type have been described in connection with the previously mentioned embodiments, the main point of the invention is to obtain a composite output having different resonance characteristics. As a result, the vibration detectors may course comprise photoelectric devices or magnetosensitive devices (e.g., magneto-resistance elements or Hall devices). Further, while, in the above-described embodiments, the internal electrical connection of the vibration detectors is utilized as a means of combining their outputs, it is possible to add the outputs externally (in the detecting circuit 3, for example). While, in this case, the detection outputs may be rectified, integrated and then added in voltage form, the cost will be increased correspondingly.

Still further, even if the detection accuracy is deteriorated depending on the construction of the knock detecting circuit 3 and the ignition timing control unit 4, the performance of the knock detecting apparatus 2 will not be deteriorated and consequently its effectiveness is independently of the construction of the control unit.

Still further, while the above-described embodiments comprise two vibration detectors, to increase the number of resonance points further will be preferable from the characteristic point of view, although this results in a more complicated construction.

Still further, while a plurality of the separately operable vibration detectors are provided as a means of obtaining different resonance points, a composite resonance system comprising for example a single piezoelectric unit having two or more resilient members (springs) may be used without giving rise to any difficulty from the principle point of view. However, it must be noted that the use of such composite resonance system tends to provide resonance points other than the essentially desired frequencies.

It will thus be seen from the foregoing that in accordance with the invention, by virtue of the fact that there are provided a plurality of vibration detectors each having a resonance point so as to provide resonance in response to one of different knocking frequency bands and the outputs of the detectors are combined cumulatively to thereby detect knock, even if a change in the operating conditions of an engine results in a change of the knock intensity or the vibration noise level, the composite output of the vibration detectors is generated and in this way any one of the vibration detectors always detects the knock by virtue of its resonance characteristic with improved sensitivity and S/N ratio, making it possible to stably detect very low intensity knock under all the engine operating conditions by virtue of the simple technique of simply combining the outputs of the vibration detectors. In particular, by placing the vibration detectors in one container, the knocking vibrations can be detected by the vibration detectors with the similar characteristics and in this way the method, although inexpensive and simple, can overcome the deficiencies in the prior art, such as, the inability to detect knock at high speed and high load operation or the deterioration of the S/N ratio causing melting of the spark plugs or damages to the engine body, thus ensuring smooth control of the ignition timing and greatly improving the durability, efficiency and fuel consumption of engines.

We claim:

1. A knock detecting apparatus for internal combustion engines comprising:
    a plurality of vibration detectors having different resonance characteristics each so as to detect a knocking vibration in one of a plurality of different frequency bands and generate a vibration output corresponding to said one frequency band, and
    means for combining the vibration outputs of said vibration detectors to produced a cumulative output.

2. An apparatus as set forth in claim 1, wherein said vibration detectors are placed in one and the same container.

3. An apparatus as set forth in claim 1, wherein said plurality of knocking vibration frequency bands comprise a higher and a lower knocking vibration frequency bands, and wherein said plurality of vibration detectors comprise two vibration detectors each thereof being adapted to detect one or the other of said higher and lower knocking vibration frequency bands.

4. An apparatus as set forth in claim 1, wherein each of said vibration detectors comprises a piezoelectric vibration detector, and wherein said piezoelectric vibration detectors are different in length from each other.

5. An apparatus as set forth in claim 1, wherein each of said vibration detectors comprises a reed member of a magnetic material, and magnetic detecting means for detecting a change in magnetic reluctance of a magnetic path caused by vibration of said reed member, and wherein said reed members are different in length from each other.

* * * * *